United States Patent [19]

Chan

[11] 4,305,694

[45] Dec. 15, 1981

[54] HYDRAULIC TAILGATE EXTENSION, BUMPER AND LOCK

[75] Inventor: Michael L. Chan, Sioux City, Iowa

[73] Assignee: Wilson Trailer Company, Sioux City, Iowa

[21] Appl. No.: 101,015

[22] Filed: Dec. 5, 1979

[51] Int. Cl.³ .............................................. B60P 1/28
[52] U.S. Cl. .................................. 414/482; 293/117; 293/118; 414/537
[58] Field of Search ............... 414/537, 538, 558, 482, 414/483; 14/71.1, 71.3, 71.7; 293/117, 118

[56] References Cited

U.S. PATENT DOCUMENTS 2,727,781  12/1955  D'Eath ........................... 414/537 X
3,369,679  2/1968  Robinson ......................... 414/558
3,580,404  5/1971  Moser .............................. 414/537
4,114,944  9/1978  Joynt et al. ..................... 414/537 X Primary Examiner—Robert G. Sheridan
Attorney, Agent, or Firm—Harvey B. Jacobson

[57] ABSTRACT

A hydraulically operated tailgate associated with a low bed, semi-trailer vehicle has a pivoted extension that is displaceable between an extended position coplanar with the ramp surface of the tailgate and a bumper position transverse to and underlying the ramp surface. A hydraulic actuating mechanism displacing the extension to the bumper position, simultaneously locks the tailgate mechanically to the frame of the semi-trailer vehicle.

8 Claims, 6 Drawing Figures

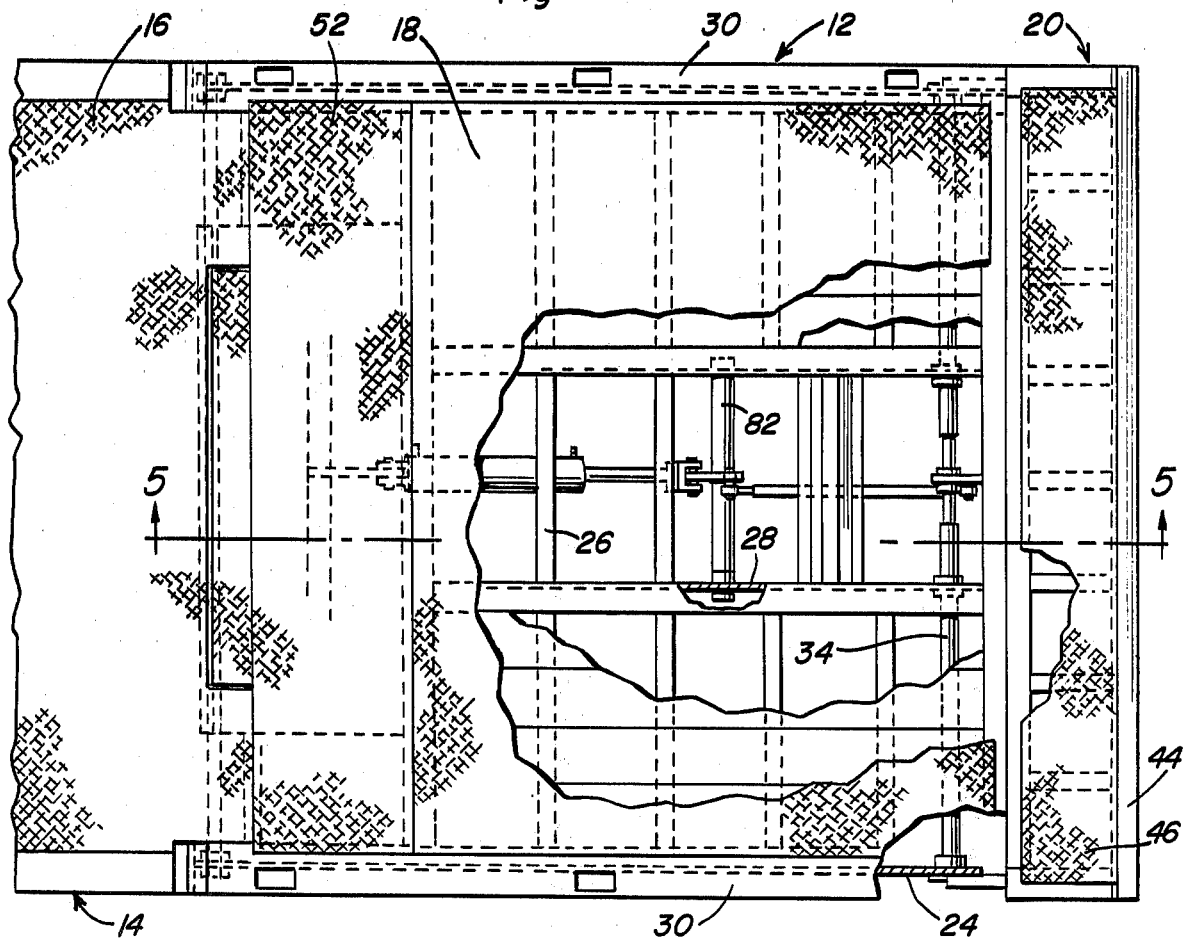
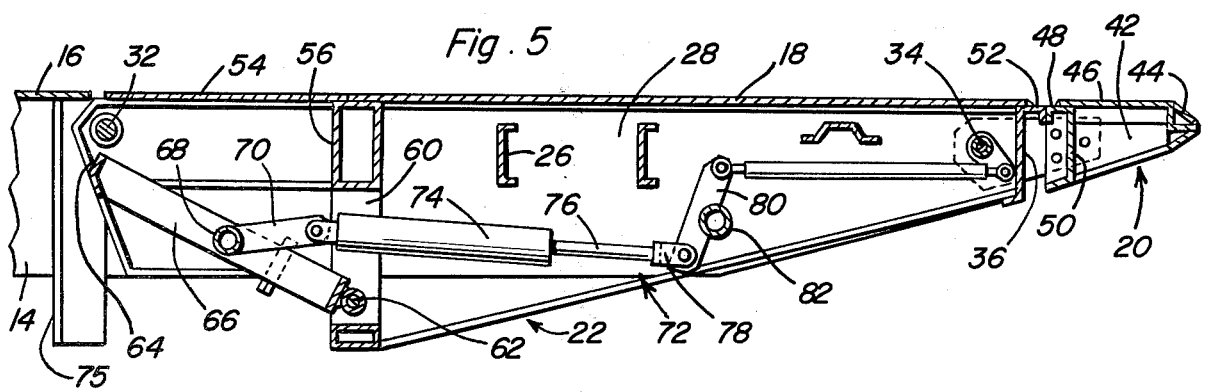
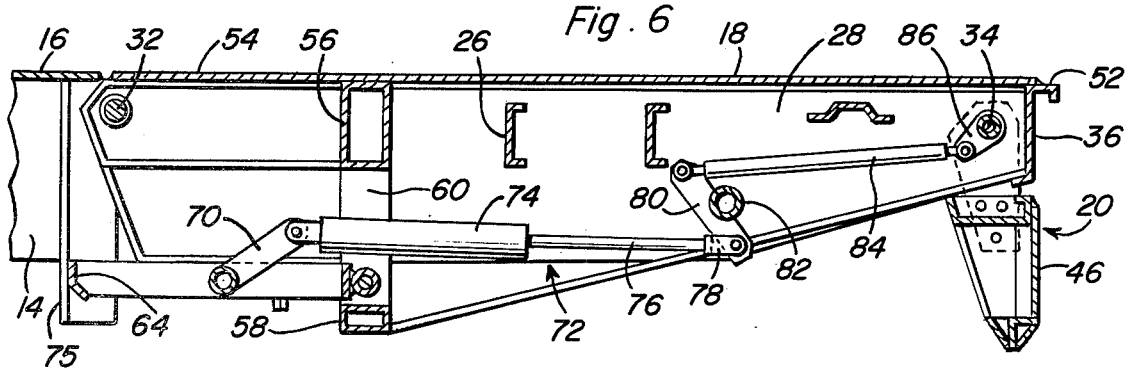

HYDRAULIC TAILGATE EXTENSION, BUMPER AND LOCK

BACKGROUND OF THE INVENTION

This invention relates to hydraulically operated tailgates for load supporting beds of vehicles and more particularly to a tailgate having a pivoted extension and mechanical locking mechanism.

Hydraulically operated tailgates are, of course, well known in the material handling arts to assist in the loading and unloading of vehicles. A pivoted tailgate with hydraulically operated extension is disclosed in prior U.S. Pat. No. 4,114,944. The adjustable mounting of rear end bumpers on tailgates are also known as disclosed in U.S. Pat. Nos. 3,533,654 and 3,695,666. Such bumper mountings provide an expensive convenience unrelated functionwise, to the tailgate and the loading and unloading operation associated with the tailgate.

It is, therefore, an important object of the present invention to provide a bumper extension for a tailgate which will enhance tailgate operation as well as to perform the protective function of a rear end bumper.

SUMMARY OF THE INVENTION

In accordance with the present invention, a pivoted extension is mounted at the rear end of a hydraulically operated tailgate. In its extended position, the extension increases the length of the tailgate ramp surface to reduce the ramp angle during a loading and unloading operation. The tailgate extension during vehicle travel is in a bumper position depending from the rear end of the tailgate to protect its underside from collisions. A hydraulic actuating mechanism displaces the tailgate extension between its extended and bumper positions as well as to operate a mechanical locking mechanism for holding the tailgate in a position coplanar with the vehicle bed during travel.

These together with other objects and advantages which will become subsequently apparent reside in the details of construction and operation as more fully hereinafter described and claimed, reference being had to the accompanying drawings forming a part hereof, wherein like numerals refer to like parts throughout.

BRIEF DESCRIPTION OF THE DRAWINGS

FIG. 4 is a top plan view with parts broken away of the tailgate portion of the vehicle with the extension extended.

FIG. 5 is a side sectional view taken substantially through a plane indicated by section line 5—5 in FIG. 4.

FIG. 6 is a side sectional view similar to FIG. 5 showing the tailgate extensin in a bumper position.

DETAILED DESCRIPTION OF PREFERRED EMBODIMENT

Figure 1:
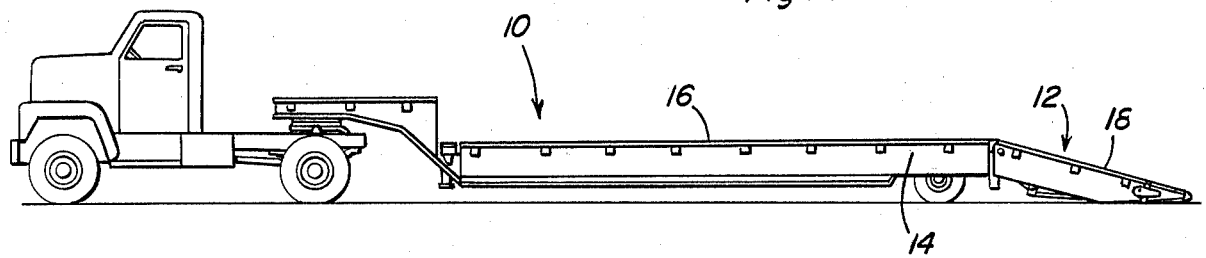
FIG. 1 is a side elevational view of a low bed semitrailer vehicle having a tailgate and extension in accordance with the present invention.
Figure 2:
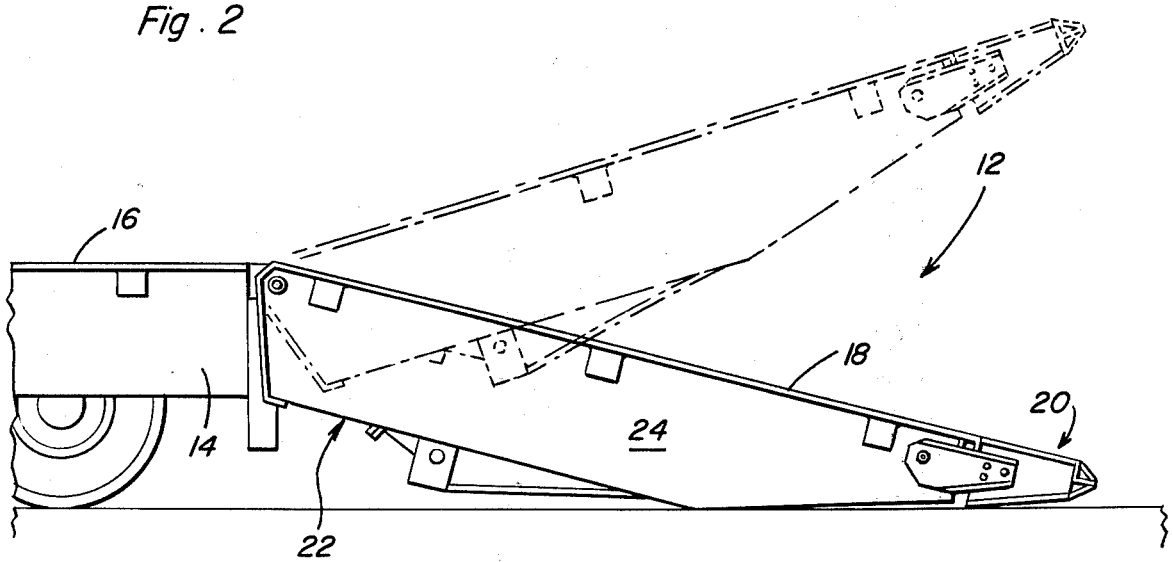
FIG. 2 is an enlarged side elevational view corresponding to the rear end portion of FIG. 1 showing the tailgate in lowered and elevated positions.
Figure 3:
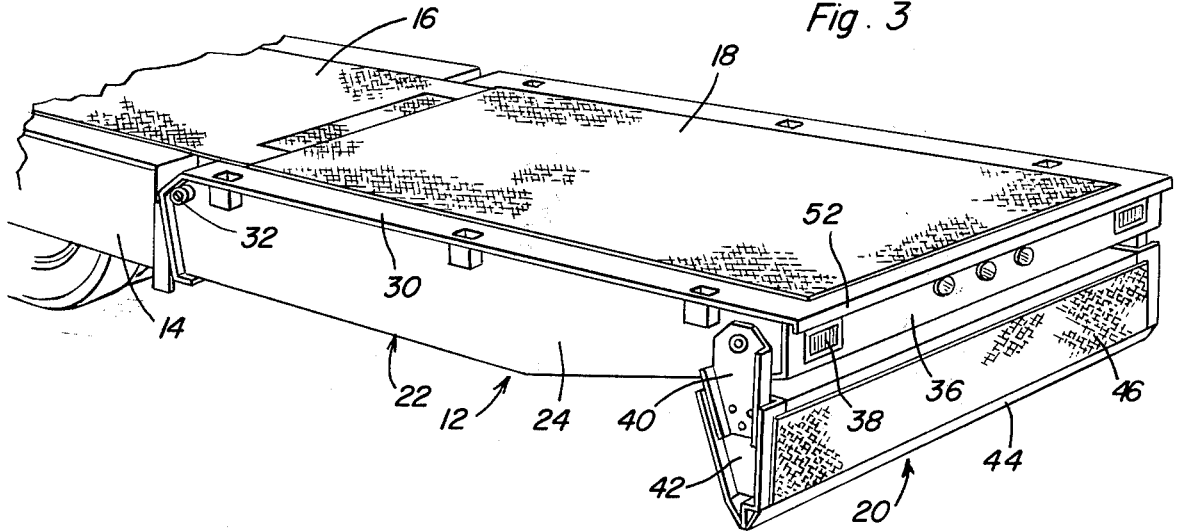
FIG. 3 is a perspective view of the tailgate portion of the vehicle shown in FIG. 1 with the tailgate extension in a bumper position.

Referring now to the drawings in detail, FIG. 1 illustrates a semitrailer vehicle denoted by reference number 10 of a generally well known construction, having a hydraulically operated tailgate assembly 12, pivotally connected to its rear end. The semitrailer vehicle frame 14, mounts a low bed 16 that presents a substantially planar surface for support of loads that are guided onto the bed by means of the tailgate assembly 12. The tailgate assembly is therefore displaceable by means of a hydraulically operated power mechanism (not shown) from a horizontal position coplanar with the bed 16 to an upper position or a lower position. In the lower position as shown by solid line in FIG. 2, the tailgate assembly presents a ramp surface portion 18 that slopes downwardly from the bed 16 to the ground in order to guide movement of loads between the bed 16 and the ground. In the upper position of the tailgate assembly 12 as shown by dotted line in FIG. 2, the ramp surface portion 18 of the tailgate assembly will guide movement of loads between the bed 16 and a loading dock. The details of the hydraulically operated power mechanism for pivotally displacing the tailgate assembly relative to the semitrailer frame 14 are well known and form no part of the present invention. However, in accordance with the present invention, the tailgate assembly is provided with a rear extension generally referred to by reference numeral 20 that is held in an extended position as more clearly seen in FIG. 2 whenever the tailgate assembly is being utilized to guide movement of a load. The tailgate extension 20 is displaced downwardly from its extended position to a bumper position as shown in FIG. 3. Whenever the semitrailer vehicle is in motion, tailgate assembly 18 is mechanically locked in position with its surface portion 18 coplanar with the bed 16 as will be explained in further detail hereinafter.

The tailgate assembly 12 includes a frame generally referred to by reference numeral 22 which includes a pair of side plate members 24 interconnected by a plurality of channel-shaped cross frame members 26 as more clearly seen in FIGS. 4 and 5. A pair of parallel spaced intermediate frame members 28 are also fixedly spaced from each other and from the side plate members 24 by means of the cross frame members. Secured as by welding to the side plate members 24 are top rails 30 to which the ramp surface portion 18 is secured by welding. Extending between the forward ends of the side plate members 24 is a hinge shaft 32 by means of which the tailgate assembly 12 is pivotally connected to the rear and of the semitrailer frame 14. A pivot shaft 34 is supported by the side plate members 24 and the intermediate frame members 28 adjacent the rear end of the tailgate assembly as more clearly seen in FIGS. 4 and 5 in order to pivotally mount the tailgate extension 20. A rear end face member 36 interconnects the side plate members 24 of the tailgate frame 22 at the rear end as more clearly seen in FIGS. 3 and 5. The end face member 36 is adapted to mount tailgate signal lamps or reflectors 38 as shown.

The tailgate extension 20 is provided with a pair of pivot arms 40 secured to the ends of the pivot shaft 34 on the outside of the side plate members 24. The pivot arms 40 are secured to side arms 42 that taper rearwardly to a terminal end assembly 44 of triangular cross section. A load surface portion 46 is secured as by welding to the terminal end 44, the side arms 42 and a flange portion 48 of a cross frame member 50 as more clearly seen in FIG. 5. When the tailgate extension 20 is in its extended position as shown in FIG. 5, the flange portion 48 of the cross frame member 50 will abut an upper flange portion 52 of the end face member 36 thereby limiting pivotable displacement of the tailgate extension to its upper position with its surface portion 46 coplanar with the ramp surface portion 18 of the tailgate assembly. The ramp surface portion 18 is secured as by welding to the flange portion 52 of the end face member.

A separate accessible section 54 of the ramp surface portion 18 overlies a portion of the tailgate assembly between the hinge shaft 32 aforementioned and a cross beam 56. Vertically spaced below beam 56 is a lower cross beam 58 interconnected with the upper beam by a pair of end posts 60 forming part of the tailgate frame assembly 22. A pivot shaft 62 is supported between the end posts 60 closely spaced above the lower cross beam 58 as shown in FIG. 5 in order to pivotally mount a mechanical locking bar 64 by means of its parallel spaced arms 66. The arms 66 are interconnected by a tubular cross frame member 68 intermediate the locking bar 64 and pivot shaft 62 to which a connecting arm 70 is rigidly connected. The arm 70 forms part of a hydraulic power mechanism 72 for displacing the locking bar 64 between a retracted position as shown in FIG. 5 to a locking position as shown in FIG. 6 engaging stop element 75 fixed to and depending from the rear end of the semitrailer frame 14.

The hydraulic power actuating mechanism 72 as shown in FIG. 5, includes a fluid pressure cylinder device 74, one end which is pivotally connected to the arm 70 aforementioned. A piston rod 76 projects from the fluid cylinder device 74 and is pivotally connected by a clevis 78 to a lever element 80 pivotally mounted by means of a pivot shaft 82 between the intermediate frame members 28. One end of the lever element 80 opposite the clevis 78, is connected to one end of a connecting rod 84, the opposite end of which is pivotally connected to an operating lever arm 86 fixed to the pivot shaft 34 to which the pivot arms 40 of the tailgate extension are connected. It will therefore be apparent from FIG. 5 that when the hydraulic cylinder device 74 is in the position shown with the piston rod 76 retracted, the tailgate extension will be in its extended position while the locking bar 64 will be retracted within the tailgate frame. The hydraulic cylinder device 74 is operated by pressurized fluid from a suitable source under control of suitable control valves (not shown) all of which is generally well known in the art and forms no part of the present invention. When the piston rod 76 is extended from the cylinder device 74 as shown in FIG. 6, the tailgate extension 20 will be in its lowered bumper position transverse to the ramp portion 18 and underlying the end face 36 so as to protect the underside of the tailgate assembly from rear end collisions. At the same time, the hydraulic operating mechanism 72 will position the locking bar 64 in its locking position as shown in FIG. 6 abutting stop 75 to thereby mechanically lock the tailgate assembly in its position with the ramp surface 14 coplanar with the semitrailer bed 16. It will also be apparent that when the tailgate extension 20 is in its extended position, the rear end face member 36 of the tailgate assembly will be protected below the load surface portion 46 which is then coplanar with both the ramp and surface portion 18 and bed 16.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as new is as follows:

1. For use with a vehicle having a frame supporting a substantially planar bed, and a tailgate pivotally connected to the frame having a ramp surface and a rear end face transverse to the ramp surface, a tailgate extension having a load surface portion, means pivotally connecting the tailgate extension to the tailgate portion is coplanar with the ramp surface in protective relation to the rear end face and a bumper position in which the load surface portion is spaced below the rear end face transverse to the ramp surface, power operated means for displacing the tailgate extension between said extended and bumper positions, including lock means rendered operative to mechanically lock the tailgate to the frame, and means connected to the power operated means for rendering the lock means operative in the bumper position of the tailgate extension.

2. The improvement as defined in claim 1 wherein said tailgate extension includes a pair of arms hingedly connected to the tailgate adjacent to the rear end face, said arms being interconnected by the load surface portion.

3. The improvement as defined in claim 2 wherein said lock means includes a bar engageable wih the frame in a locked position in which the ramp surface is substantially coplanar with the bed, and means pivotally mounting the bar on the tailgate for displacement from said locked position by the power operated means simultaneous with said displacement of the tailgate extension to the extended position.

4. The improvement as defined in claim 1 including means for releasing the lock means in response to displacement of the tailgate extension to the extended position by the power operated means.

5. For use with a vehicle having a frame supporting a substantially planar bed, and a tailgate pivotally connected to the frame having a ramp surface and a rear end face transverse to the ramp surface, a tailgate extension having a load surface portion, means operatively connecting the tailgate extension to the tailgate for displacement between an extended position in which the load surface portion is coplanar with the ramp surface in protective relation to the rear end face and a bumper position in which the load surface portion is spaced below the rear end face transverse to the ramp surface, and means mechanically locking the tailgate to the vehicle frame in the bumper position of the tailgate extension for holding the ramp surface coplanar with the bed.

6. The improvement as defined in claim 5, wherein said tailgate extension includes a pair of arms hingedly connected to the tailgate adjacent to the rear end face, said arms being interconnected by the load surface portion.

7. For use with a vehicle having a frame, a tailgate pivotally connected thereto and an extension pivotally connected to the tailgate, said frame and tailgate respectively mounting bed and ramp surfaces, the improvement residing in means for releasably locking the tailgate to the frame in a travel condition with said bed and ramp surfaces substantially coplanar, means for displacing the tailgate to an inclined loading position with the extension coplanar with the ramp surface, and means for holding the extension in a bumper position transverse to the ramp surface in the travel condition of the tailgate.

8. The improvement as defined in claim 7 wherein said extension has a load surface portion spaced below the ramp surface in the bumper position.

* * * * *